(12) United States Patent
Stokman et al.

(10) Patent No.: US 12,401,184 B2
(45) Date of Patent: Aug. 26, 2025

(54) PROTECTION CIRCUIT CONNECTING AND DISCONNECTING A DC OPERATED DEVICE FROM A DC POWER SOURCE

(71) Applicant: DC Systems B.V., Aalsmeer (NL)

(72) Inventors: Henricus David Stokman, Aalsmeer (NL); Panagiotis Kolios, Leiden (NL)

(73) Assignee: DC Systems B.V., Aalsmeer (NL)

( * ) Notice: Subject to any disclaimer, the term of this patent is extended or adjusted under 35 U.S.C. 154(b) by 483 days.

(21) Appl. No.: 17/883,761

(22) Filed: Aug. 9, 2022

(65) Prior Publication Data

US 2023/0059577 A1    Feb. 23, 2023

Related U.S. Application Data

(60) Provisional application No. 63/233,770, filed on Aug. 17, 2021.

(51) Int. Cl.
*H02H 3/20*      (2006.01)
*H02H 1/00*      (2006.01)

(52) U.S. Cl.
CPC .......... *H02H 3/202* (2013.01); *H02H 1/0007* (2013.01)

(58) Field of Classification Search
CPC ...... H02H 3/202; H02H 1/0007; H02H 3/243; H02H 3/445; H02H 1/0015; H02H 7/1213;
(Continued)

(56) References Cited

U.S. PATENT DOCUMENTS

| | | | | |
|---|---|---|---|---|
| 4,752,865 A | * | 6/1988 | Hatakeyama | H02M 3/10 363/126 |
| 7,821,753 B2 | * | 10/2010 | Evans | H02H 9/001 361/90 |

(Continued)

FOREIGN PATENT DOCUMENTS

| | | |
|---|---|---|
| EP | 2251941 A1 | 11/2010 |
| WO | 0239561 A2 | 5/2002 |

OTHER PUBLICATIONS

Steven M. Kaplan, "V," in Wiley Electrical and Electronics Engineering Dictionary, IEEE, 2004, pp. 829-850 Retrieved from the Internet: < https://ieeexplore.ieee.org/xpl/ebooks/bookPdfWithBanner.jsp?fileName=5273124.pdf&bkn=5273107&pdfType=chapter> (Year: 2004).*

(Continued)

*Primary Examiner* — Jared Fureman
*Assistant Examiner* — Nicolas Bellido
(74) *Attorney, Agent, or Firm* — Troutman Pepper Locke LLP

(57) ABSTRACT

A protection circuit for connecting and disconnecting to a DC power source, and a DC operated device including such a protection circuit. The protection circuit has input terminals for receiving power from a DC power source and output terminals for providing power to a DC operated device; a first stage with a voltage measurement circuit coupled between the input terminals; and a second stage following the first stage including a pre-charge control circuit. The protection circuit further includes a digital controller arranged for controlling activating and de-activating a local PSU for supplying power to electronics of the DC operated device. The digital controller is arranged for measuring a voltage of the voltage measurement circuit and de-activating the local PSU when detecting a voltage drop on the first (Continued)

input terminal that exceeds a predetermined threshold dip and/or threshold slope.

24 Claims, 4 Drawing Sheets

(58) Field of Classification Search
CPC .... H02H 3/087; G01R 19/0084; G01R 19/12; G01R 19/165; H02J 7/0029; H02J 2207/50

See application file for complete search history.

(56) References Cited

U.S. PATENT DOCUMENTS

| | | | |
|---|---|---|---|
| 2008/0174926 A1* | 7/2008 | Evans | H02H 9/001 361/93.7 |
| 2015/0340854 A1 | 11/2015 | Richter et al. | |
| 2023/0344222 A1* | 10/2023 | Stokman | H02J 1/102 |

OTHER PUBLICATIONS

European Search Report and Search Opinion dated Jan. 5, 2023 for corresponding European Patent Application No. 22183977.2, 9 pages.

* cited by examiner

PROTECTION CIRCUIT CONNECTING AND DISCONNECTING A DC OPERATED DEVICE FROM A DC POWER SOURCE

The present invention relates to DC electrical grids and DC operated devices powered via a DC voltage bus of such a DC electrical grid. In particular, the invention relates to a protection circuit for DC operated devices that may simply be electrically connected and disconnected from a DC voltage bus.

BACKGROUND

DC electrical grids are gaining more prominence due to a number of advantages that a DC-operated electrical grid may have over an alternating current (AC)-operated electrical grid. One advantage is the efficiency associated with DC energy generation, especially with sustainable energy sources such as e.g. solar power or wind power. Other advantages include efficiency associated with conversion of the DC voltage to higher or lower voltages and storage of the DC energy as e.g. in capacitors and batteries, and hence consume less energy.

In comparison with AC electrical grids, with DC electrical grids there is an increased risk of arcing when disconnecting a DC operated device. Arcing may cause heating problems, fire, create EMC problems, and wear out contacts. This hinders adoption of DC electrical grids in domestic applications. In addition, it should provide similar ease of use as associated with well-known AC wall-outlets of AC electrical grids.

DC switches and wall outlets that aim to diminish arcing are known, for example from EP2251941A1 wherein an electrical plug needs to be inserted and thereafter rotated. However, in comparison with AC, these require additional manual actions before an electrical connection is established.

SUMMARY OF INVENTION

It is an object of the invention to alleviate the risks of arcing when disconnecting of DC operated devices from a DC voltage bus.

According to the invention, this object is achieved by providing a protection circuit for connecting and disconnecting a DC operated application device from a DC power source. The protection circuit including a first input terminal (2) and a second input terminal (3) for receiving power from a DC power source, a first output terminal (4) and a second output terminal (5) for providing power to a DC operated device. Further including a first stage (6) having a voltage measurement circuit coupled between the first and second input terminals (2, 3), and a second stage (7) following the first stage (6) comprising a pre-charge control circuit (9), with the second stage in parallel with the first stage between the first and second input terminals (2, 3). The protection circuit further includes a digital controller (10) arranged for controlling activating and de-activating of a local PSU (12) for supplying power to electronics of the DC operated device (22). Wherein the digital controller (10) is arranged for measuring a voltage level (25) of the voltage measurement circuit indicative of the voltage level of the first input terminal (2); and for de-activating the local PSU (12) when detecting a voltage drop of the first input terminal (2) that exceeds a predetermined threshold dip and/or threshold slope.

According to one aspect, there is provided a DC operated device comprising a protection circuit as disclosed for connecting and disconnecting to a DC power source.

According to another aspect, there is provided a method for disconnecting a DC operated device from a DC power source, wherein the DC operated device is provided with a protection circuit as disclosed.

Further objects, aspects, effects and details of particular embodiments of the invention are described in the following detailed description of a number of exemplary embodiments, with reference to the drawings.

BRIEF DESCRIPTION OF DRAWINGS

By way of example only, the embodiments of the present disclosure will be described with reference to the accompanying drawings, wherein.

DETAILED DESCRIPTION

Figure 1:
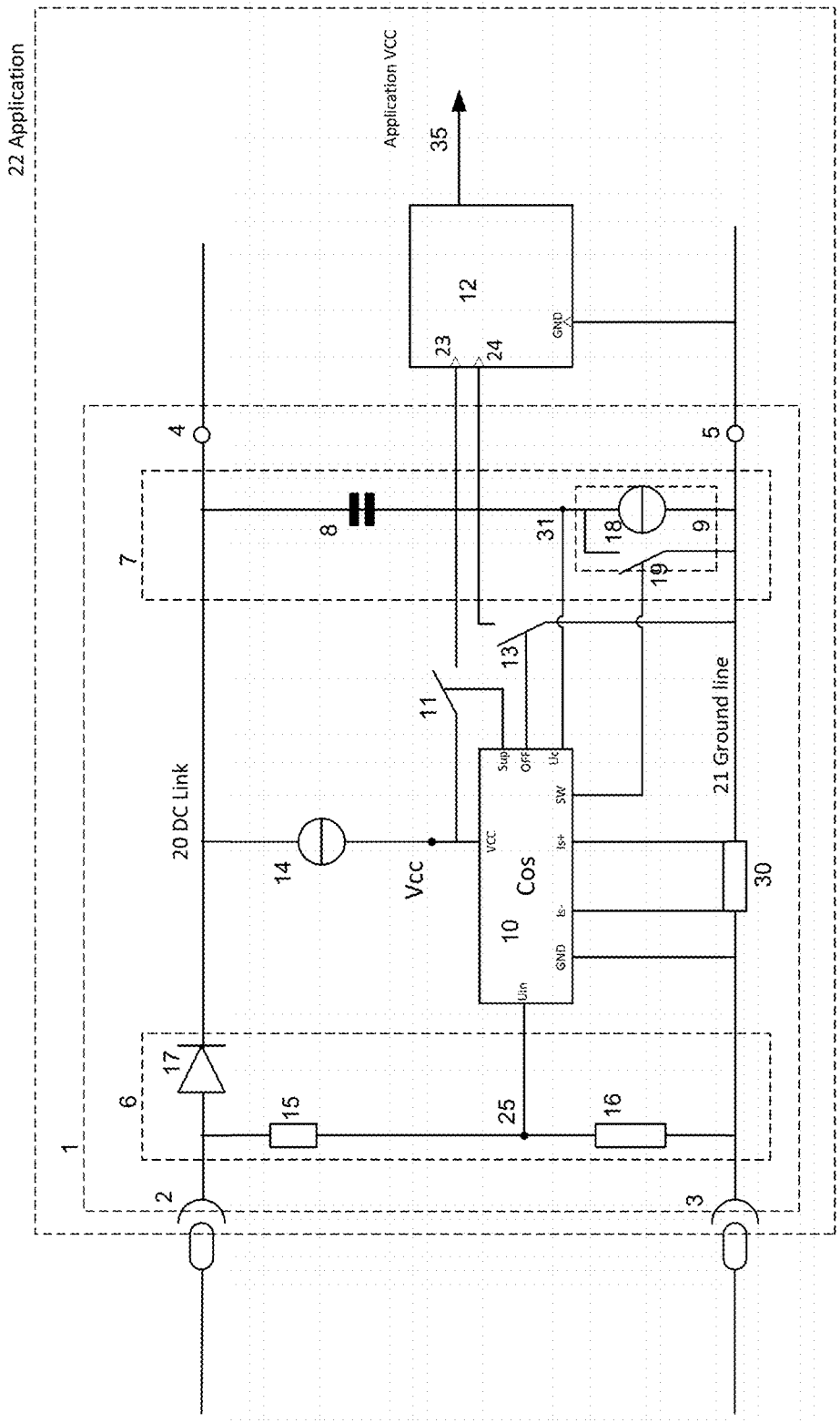
FIG. 1 illustrates schematically an example of a protection circuit in accordance with the invention.

FIG. 1 shows a DC protection circuit 1 for disconnecting and connecting a DC operated application device 22 from a main DC power source. The protection circuit may be included as part of a DC operated device, as in FIG. 1, or it may be provided separately as in FIG. 5. The main DC power source, of which only two connection terminals are shown, may provide any level of power or current level. The main requirement is that the quality of provided signals are strictly regulated. Within DC operated grids, the nominal operating range has to be well-defined. For example, when in a DC system a nominal operation is considered to be a range between 320V-380V, a drop in voltage range of between 250V-320V may be defined as an emergency mode. This may be due to e.g. a shortage of available power, in which case the DC application connected to the grid may stop drawing power. When it drops further to below 250V, the application will entirely stop drawing power, in which case any protective electronics monitoring operation of the application are also no longer powered.

The application device may be any type of active device that operates on DC voltage, such as e.g. an LED-driver, a battery charger, a device with a USB-C connection. In terms of power an application device may operate within e.g. 100 W, 1 kW or 10 kW and at voltage levels of e.g. 350V up to 700V, or e.g. 5V/3A up to 20V/5A in compliance with the USB PD standard.

The protection circuit 1 has a first input terminal 2 and a second input terminal 3 for receiving power from the main DC power source. These input terminals 2, 3 together form an input side of the protection circuit 1. The protection circuit 1 further has a first output terminal 4 and a second output terminal 5 for distributing within a DC operated application device 22 or more generally for providing power to such an application 22. These output terminals 4, 5 together form an output side of the protection circuit 1.

The DC operated application device 22 is connected to the output terminals 4, 5. In operation, the output terminal 4 delivers the DC voltage present on a DC link 20, whereas the output terminal 5 delivers connection to a ground line 21. In the description, a DC link refers to a positive voltage line or bus, a bar or a trace on a PCB.

A DC operated device may have a local power supply unit PSU 12 for powering on of the Vcc line 35 of the DC operated device 22. The Vcc line 35 provides the power for any active elements of the application device 22, such as electronics, that execute any control programs, switches, and/or other components of the device 22. The local PSU 12 may include a local PSU controller for controlling the powering on of the Vcc line 35.

The protection circuit 1 further has a first stage 6 which includes a voltage measurement circuit 15, 16 coupled between the first and second input terminals 2, 3. In the example of FIG. 1, the voltage measurement circuit includes as a voltage divider circuit having at least two impedances 15, 16 connected in series. The connection between the at least two impedances 15, 16 provides a voltage level 25, which is determined by the respective dimensions of the at least two impedances 15, 16. The impedances preferably are passive resistors. The first stage 6 may further include a current directional element, in this example a diode 17. This current directional element may prevent current flowing back into the first stage 6.

The protection circuit 1 further has a second stage 7 following the first stage 6, which includes a pre-charge capacitor 8 in series with a pre-charge control circuit 9. The second stage 7 is connected in parallel with the first stage 6 between the first and second input terminals 2, 3.

The protection circuit 1 further includes a digital controller 10. The digital controller 10 is an active element that is powered by an auxiliary power source 14. The auxiliary power source 14 may be common battery, it may be an active power source fed by the DC link that is connected to the first input terminal, such as a dependent current source that is fed from the DC link 20, or it may be any other suitable active power source for powering the digital controller 10. As an indication of power that may be provided e.g. in the order of 3 mA.

Any DC operated device 22 or DC application will include electronics that need to be powered in order to operate. Thereto such devices will have a local power supply unit PSU 12 to facilitate delivery of the required power. In order to control power that is to be delivered to the application electronics, the protective circuit 1 is further provided with a digital controller 10. The digital controller 10 is arranged for controlling activating and de-activating of the local PSU 12 for supplying power to electronics of the DC operated device 22. The digital controller 10 may control activating and de-activating of the local PSU 12 by operating a power switch 11 for connecting the auxiliary power source 14 to a power input 23 of the local PSU 12. In addition, or instead, the digital controller 10 may operate a ground switch 13 for connecting a ground line, such as ground line 21, to a soft-start input 24 of the local PSU 12. In the case of connecting to ground only, no connection between source 14 and local PSU 12 is required.

In an alternative embodiment, instead of the digital controller 10 activating a local PSU controller, it could control the PSU of an application device directly without intermediate local controller. This is especially advantageous when the protection circuit forms an integral part of the application device.

Referring again to FIG. 1, the digital controller 10 is further arranged for measuring a voltage of the voltage measurement circuit. In the example of FIG. 1, the point of measurement 25 between the two impedances 15, 16 is connected to an input of the digital controller 10. The measured voltage will be evaluated for determining whether a condition for powering down the DC operated device 22 is occurring.

Accordingly, the digital controller 10 is further arranged for de-activating the local PSU 12 when detecting a voltage drop on the first input terminal 2 that exceeds a predetermined threshold dip and/or a or threshold slope.

Figure 2:
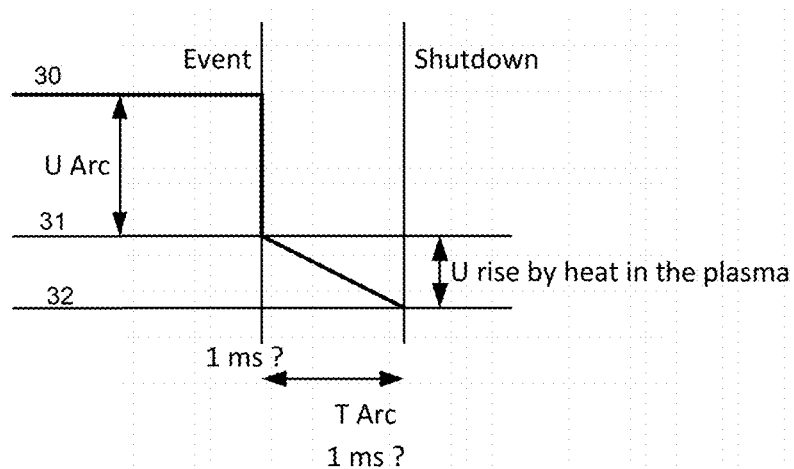
FIGS. 2-4 illustrate graphs of examples of voltage drop profiles that may occur in a DC operated grid.
Figure 3:
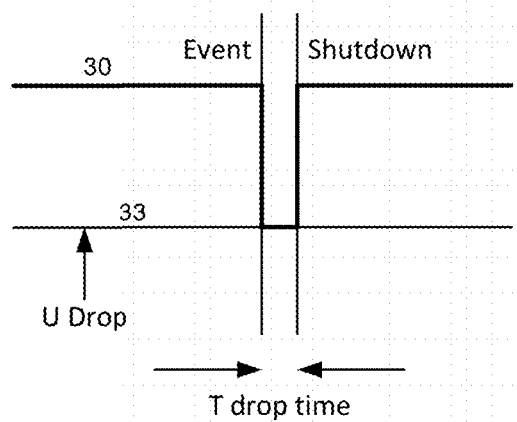
Figure 4:
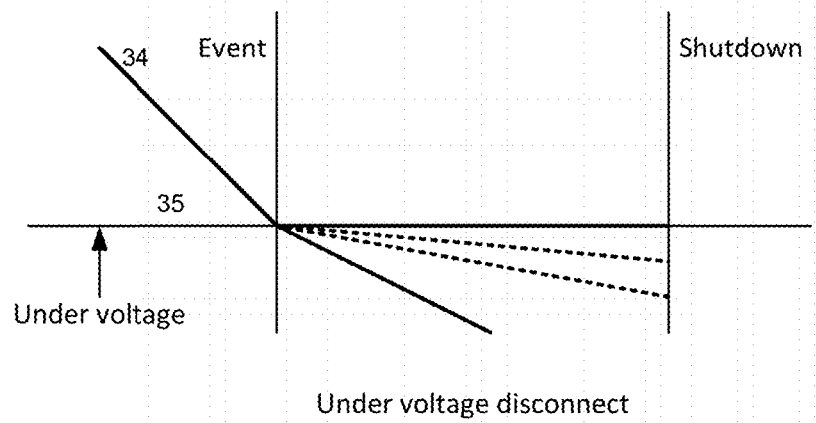

FIGS. 2-4 illustrate graphs of examples of voltage drop profiles that may occur in a DC operated grid. The voltage level 30 provided by the main DC power source would be in the order of e.g. 360 V. This voltage level 30 is expected to be very reliable and constant. Consequently, when a drop in voltage would occur at the terminals 2,3 of the protection circuit 1, this is an event that may indicate that the DC operated device 22 is being disconnected or that there is a bad connection.

Referring to FIG. 2, a typical voltage drop profile is shown when the DC operated device 22 would be disconnected from terminals of the main DC power source as shown e.g. in FIG. 1. The voltage level 30 provided by the main DC power source would be in the order of e.g. 360 V. When an immediate drop in voltage within range of 1 microsecond in the order of 7-20 V or 10-40 V to a lower voltage level 31 would occur at the terminals 2, 3 of the protection circuit 1, this may indicate that it is being a disconnected. Following the initial immediate drop, the voltage drop profile may show a slope dropping further down to a lower voltage level 33. This slope may occur over a time period within a range of 1 millisecond. Under the circumstances of such a voltage drop profile there is the risk of arcing. Accordingly, the DC operated device or application 22 should be powered down.

Without preventive measures, disconnecting the DC operated application device under current from the DC power source would result in arcing. When the disconnecting material or plug is pulled, a rapid voltage drop U_arc across the gap will occur, in the order of 10-40 V depending e.g. on air humidity and pressure The voltage drop occurrence is fast process, less than 1 microsecond, after the gap, therefore the arc keeps extending and therewith also the arc voltage across the gap which also elongates the arc. The arc voltage increases with arc length, about 1V per 1 mm. Due to this elongation, the voltage at the input terminal will slowly fall along a slope.

Apart from risks of arcing, other types of events may occur that warrant a controlled response such as shutting down in a controlled manner.

Referring to FIG. 3, a typical voltage drop profile is shown when the connection between the main DC power source and the DC operated device 22 would be interrupted. Such interruption occurs shows when the voltage level of e.g. 360 V would drop within 1 microsecond in the order of e.g. 20-30 V to a lower voltage level 33, and following the initial drop, after a period of interruption in the range of 10 milliseconds, the voltage may rise back again to the original voltage level 30. Under the circumstances of such a voltage drop profile i.e. drop time T, the event may occur once more and as preventive measure the cause of such interruption should be investigated. Accordingly, the DC operated device or application 22 should be powered down. Such interruption may indicate that the connection is not reliable, or it may indicate that the system which the device is part of is no longer functioning as specified. For example, in case of multiple loads such as a string of multiple LED lights, each equipped with a DC LED driver, when one LED driver or LED light fails, as with short circuit, the power is no longer drawn by failed load will be distributed and consumed by the remaining loads, meaning each load will consume more power. This may lead to current oscillation, which is to be prevented by the diode, and would require the system to be powered down.

Referring to FIG. 4, a typical voltage drop profile is shown when the voltage level provided by the main DC power source deteriorates over time. In this case the voltage level 34 does not drop immediately, but gradually lowers to a certain lower threshold voltage level 35, e.g. over a time period in the order of 10 ms. This lower threshold would indicate an undervoltage at which the DC operated device or application 22 would not function properly or incorrectly. Regardless of the profile of any further dropping or rising, as indicated by additional dotted lines, when such undervoltage 35 is reached the DC operated device or application 22 should be powered down. Though in this case the risk of arcing may be limited, something else may be occurring that requires verification.

PRECHARGING

When the application device is initially connected and to be powered by the main DC power source, the electronics of the device, as described above, need to be powered before main power is delivered to the application device. And prior to this activation of the electronics, e.g. via the local power source controller, a DC link capacitor needs to be charged. Such DC link capacitor is part of any application device and connected between the DC link (21) and ground line (20). In operation, the DC link capacitor is intended to supply fast current requested by the device, when e.g. mosfets in the device switch fast. It further provides a hold-up time for the device in case the grid voltage should drop. During activation, it needs to be ensured that this DC link capacitor is charged gradually over time, so no abrupt voltage or current spike occurs. This is referred to as pre-charging of the application. This pre-charging may be achieved in various ways, of which some will be explained further below.

Figure 5:
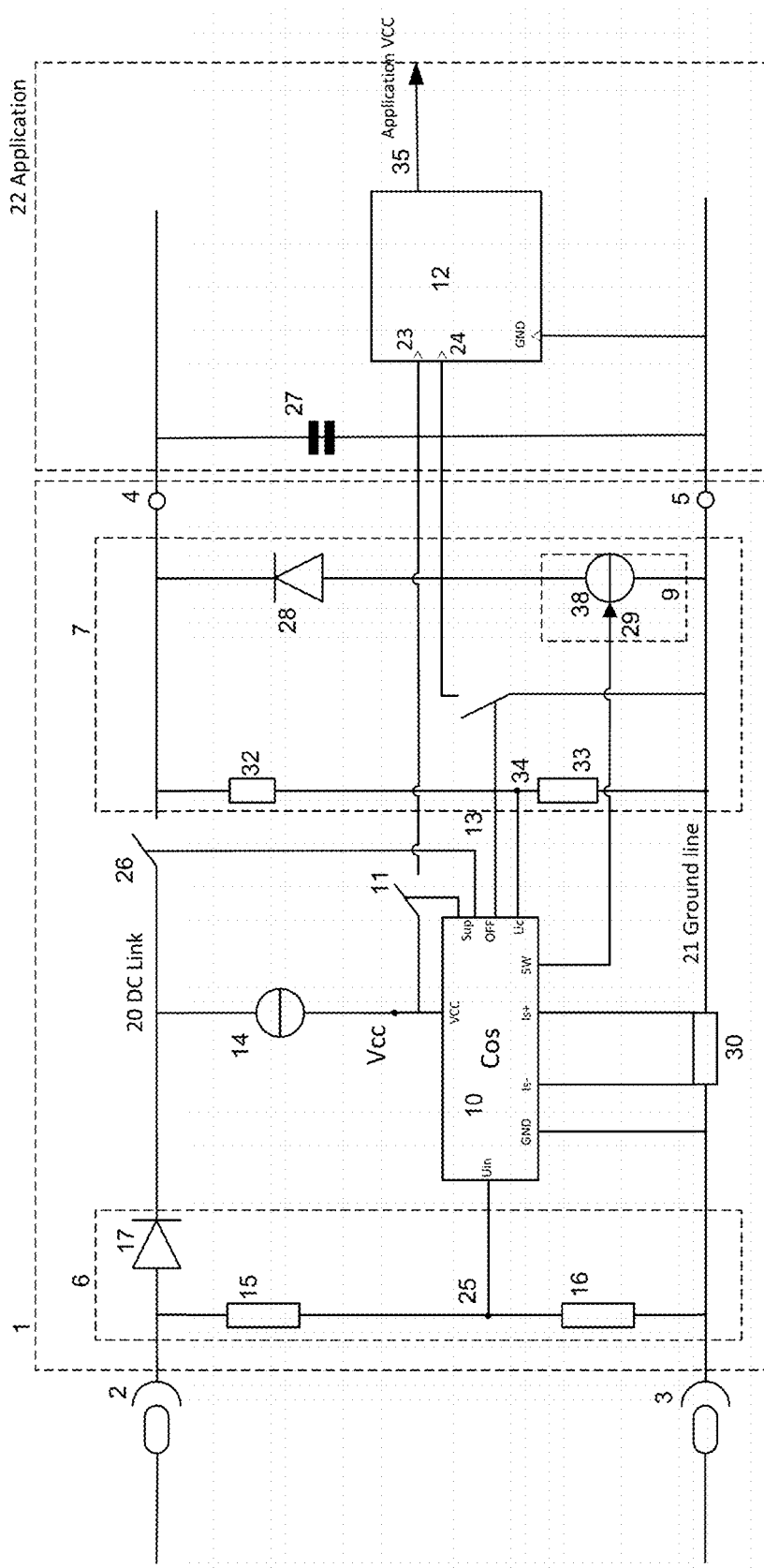
FIG. 5 illustrates another example of a protection circuit in accordance with the invention.

Referring again to FIG. 1, in this embodiment the pre-charge capacitor 8 of the protective circuit 1 also functions as DC link capacitor for the application device 22. In such case, the pre-charge capacitor 8 is connected in series with the pre-charge control circuit 9. This allows the protective circuit 1 to be implemented as an integral part of the application device. Alternatively, as shown in FIG. 5, the application device may have a DC link capacitor 27, in which case a pre-charge capacitor 8 is not necessarily required. If the application device does have the DC link capacitor 27 and the second stage 7 of the protection circuit 1 does include the pre-charge capacitor 8 as in FIG. 1, then the pre-charge capacitor 8 is first pre-charged, followed by activation of the electronics of the device, and followed by pre-charging of the local DC link capacitor 27.

In the embodiment of FIG. 1, the pre-charge control circuit 9 includes a current source 18 in parallel with a bypass switch 19. Alternatively, the source 18 may also be a voltage source or a passive dissipative component, like e.g. a variable resistor, for facilitating pre-charging of the application device. The purpose of the pre-charge is to gradually raise the voltage level on the DC link side of the capacitor 8 up to the voltage level of the DC power source.

The bypass switch 19 is to be operated in dependence of a pre-charge condition, i.e. indicating that the pre-charging is completed. Thereto the digital controller 10 is further arranged for determining the pre-charge condition by measuring a voltage level 31 in the second stage 7. And the digital controller 10 is further arranged for operating the bypass switch 19 based on the pre-charge condition. When the pre-charging is completed, the bypass switch 19 is closed to connect the DC link capacitor 8 with the ground line 21. Basically, the pre-charge condition is determined by the voltage across the capacitor 8 matching the input voltage on the input terminals 2,3 or when no current is flowing through pre-charging circuit 9.

In the embodiment of FIG. 1, the power source 18 functions like a drain, drawing current from one side of the DC link capacitor until that side equals the ground reference voltage i.e. zero. If that ground side is equal to ground or zero, the other side of the DC link capacitor consequently is equal to the voltage level of the DC link, meaning that pre-charging of the application is completed.

Referring to FIG. 5, another example of a protective circuit is shown. In this example, the same reference numbers as in FIG. 1 for the same or similar components have been used. In the example of FIG. 5, the protective circuit is separate from the application device 22 which has a DC link capacitor 27, and the second stage 7 or pre-charge stage has a pre-charge diode 28 instead of pre-charge capacitor 8. The pre-charge control circuit 9 includes a power source 38, in this case a current source 38. Alternatively, the source 38 may also be a voltage source, like a battery, or other source for facilitating pre-charging of the application device. In this embodiment, the digital controller 10 is arranged for operationally controlling the source 38 directly, e.g. a mosfet controlled battery or other type of transistor combined with a source.

In the embodiment of FIG. 5, the power source 38 delivers current via the diode 28 to the DC link where the voltage level due the DC link capacitor 28 ramps up gradually, as the diode 28 limits the current that is drawn by the capacitor. As one side of the DC link capacitor is connected to the ground reference voltage i.e. zero, the other side of the DC link capacitor consequently rises. When the desired voltage level is equal to that of DC power source that is to be connected the pre-charging of the application is completed. With pre-charging completed the power source 38 is shut down, and a link switch 26 may be closed to fully power the application 22.

In case the source 38 is combined with a circuit driven by that a source e.g. like a flyback converter with a DC battery, or other circuit that inherently prevents current flowing back, the diode 28 is not required and optional.

In order for the digital controller 10 to assess whether pre-charging is completed, it needs a measurement input. In the embodiment of FIG. 1, this available from voltage point 31. In the embodiment of FIG. 5, with the protective circuit being separate from the application device, another voltage measurement circuit is provided. In the example of FIG. 5, the second stage (7) includes a voltage measurement circuit including two impedances 32, 33, which provides between the two impedances 32, 33 a voltage level 34. The impedances preferably are passive resistors. Monitoring i.e. measuring the voltage level 34 as indication of the pre-charge status allows the digital controller to assess when pre-charging is completed. The measurement is preferably performed by a galvanic isolated sensor or detector, like e.g. an optocoupler or an isolated amplifier.

OVERLOAD

The protection circuit 1 may further be adapted to address overload conditions, whether due to an excess current or voltage, by means of the shunt resistor 30. In either example of FIG. 1 or 5, the protection circuit 1 includes the shunt resistor 30 connected in series with the ground line 21. In such configuration, the digital controller 10 may be further arranged for monitoring operating conditions of the application device 22, such as an overload condition. An overload condition may relate to an excess current which may occur when e.g. there is a short circuit in the device. For example, if the application is drawing current beyond a pre-determined limit, like 0.29A for 100 W application 2.86A for a 1 kW application, or 28.6A for a 10 kW application.

The protection circuit 1 may further include an overload switch 26 in series with the DC link 20. The link switch 26 and the overload switch 26 may be implemented as separate switches or as a single switch as shown in FIG. 5. The switch 26 may be a solid state component, such as MOSFET, JFET, bipolar transistor, IGBT or other type of switching element. The digital controller 10 is then further arranged for detecting overload conditions of the DC operated device by means of the shunt resistor 30 and for operating the overload switch 26 to disconnect the DC link 20 from the second stage 7. The overload switch may be operated in response to a detected overload condition.

In the embodiment of FIG. 1 the digital controller 10 may respond to detection of an overload condition by powering down the local PSU or local PSU controller of the application, whereas in FIG. 5 the digital controller 10 may open and disconnect overload switch 26.

Figure 6:
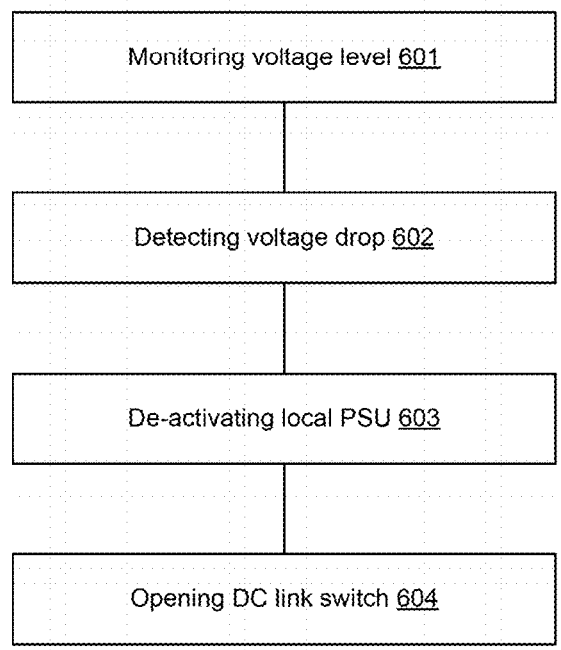
FIG. 6 illustrates an example of a method for operating a protection circuit in accordance with the invention.

Referring to FIG. 6, an example of a method for operating a protection circuit as described above is shown. The method similarly applies to disconnecting a DC operated application device from a DC power source, where the DC operated device is provided with a protection circuit as described above. The method includes monitoring 601 the voltage level of the input terminals. And when detecting 602 a voltage drop across the input terminals, de-activating 603 the local PSU of the application device. And, if a DC link switch 26 is present, opening 604 the DC link switch 26. In the case that a DC link switch 26 is present, the opening 604 of the DC link switch 26 may be performed instead of de-activating 603 the local PSU.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. For example, the protection circuit may be a stand-alone part connected with the DC operated device, or it may form an integral part thereof. Various levels of integration are possible, depending on the number of controllers present in the circuit and the device and the capabilities of these controllers. It also may use a single controller for all required operations as described herein. In addition, it is specifically contemplated that a particular feature described, either individually or as part of an embodiment, can be combined with other individually described features, or parts of other embodiments.

The invention claimed is:

1. A protection circuit for connecting and disconnecting a DC operated application device from a DC power source, comprising
   a first input terminal and a second input terminal for receiving power from the DC power source;
   a first output terminal and a second output terminal for providing power to the DC operated application device;
   a first stage comprising a voltage measurement circuit coupled between the first and second input terminals;
   a second stage following the first stage comprising a pre-charge control circuit, the second stage in parallel with the first stage between the first and second input terminals,
   wherein the first stage further comprises a current directional element, such as a diode, arranged for preventing current flow from the second stage to the first stage;
   a digital controller arranged for controlling activating and de-activating of a local power supply unit (PSU) for supplying power to electronics of the DC operated application device;
   wherein the digital controller is arranged for:
      measuring a voltage level of the voltage measurement circuit indicative of the voltage level of the first input terminal;
      de-activating the local PSU when detecting a voltage drop having a voltage dropping slope of the first input terminal that exceeds a predetermined threshold in voltage level drop and/or a threshold of the voltage dropping slope.

2. The protection circuit according to claim 1, wherein the voltage measurement circuit comprises a voltage divider circuit comprising at least two impedances connected in series and a voltage level between the at least two impedances.

3. The protection circuit according to claim 1, wherein the first input terminal is part of a DC link and the second input terminal is part of a ground line.

4. The protection circuit according to claim 1, wherein the second stage further comprises a pre-charge capacitor in series with the pre-charge control circuit.

5. The protection circuit according to claim 1, further comprising an auxiliary power source for powering the digital controller, the auxiliary power source comprising a battery, an active power source fed by a DC link connected to the first input terminal, or another active power source.

6. The protection circuit according to claim 1, wherein the digital controller controls activating and de-activating of the local PSU for supplying power to electronics of the DC operated application device by:
   operating a power switch connecting an auxiliary power source to a power input of the local PSU; and/or
   operating a ground switch connecting a ground line to a soft-start input of the local PSU.

7. The protection circuit according to claim 1, wherein the pre-charge control circuit comprises:
   a bypass switch in parallel with a power source, such as a current source, a voltage source, or passive dissipative component; or a power source that is operationally controlled by the digital controller.

8. The protection circuit according to claim 7, wherein the digital controller is further arranged for:
   determining a pre-charge condition by measuring a voltage level in the second stage; and
   operating the bypass switch based on the pre-charge condition; or
   controlling operation of the power source based on the pre-charge condition.

9. The protection circuit according to claim 1, further comprising a shunt resistor in series with a ground line.

10. The protection circuit according to claim 9, wherein the digital controller is further arranged for monitoring an operating condition of the DC operated application device by means of the shunt resistor.

11. The protection circuit according to claim 10, further comprising an overload switch in series with the DC link; and wherein the digital controller is further arranged for:
   detecting an overload condition of the DC operated application device by means of the shunt resistor; and
   operating the overload switch to disconnect the DC link from the second stage; and/or
   operating the power switch and/or a ground switch to de-activate the local PSU or a local PSU controller.

12. The protection circuit according to claim 11, wherein the overload switch is a solid state component, such as MOSFET, JFET, bipolar transistor, or other type of switching element.

13. A DC operated application device comprising a protection circuit according to claim 1.

14. A method for disconnecting the DC operated application device from the DC power source, wherein the DC operated application device is provided with the protection circuit according to claim 1, the method comprising:
   monitoring the voltage level of the input terminals;
   when detecting the voltage drop across the input terminals, de-activating the local PSU of the DC operated application device and/or, if a DC link switch is present, opening the DC link switch.

15. A protection circuit for connecting and disconnecting a DC operated application device from a DC power source, comprising
   a first input terminal and a second input terminal for receiving power from the DC power source;
   a first output terminal and a second output terminal for providing power to the DC operated application device;
   a first stage comprising a voltage measurement circuit coupled between the first and second input terminals;
   a second stage following the first stage comprising a pre-charge control circuit and a pre-charge capacitor in series with the pre-charge control circuit, the second stage is in parallel with the first stage between the first and second input terminals, wherein the pre-charge control circuit includes a power source in parallel with a bypass switch;
   a digital controller arranged for controlling activating and de-activating of a local power supply unit (PSU) for supplying power to electronics of the DC operated application device;
   wherein the digital controller is arranged for:
      measuring an input voltage level of the voltage measurement circuit indicative of the voltage level of the first input terminal;
      determining a pre-charge condition by measuring a voltage level across the pre-charge capacitor and comparing the voltage level across the pre-charge capacitor with the input voltage level;
      operating the bypass switch based on the determined pre-charge condition such that when the voltage across the capacitor matches the input voltage the digital controller is arranged to close the bypass switch and activate the local PSU;
      de-activating the local PSU when detecting a voltage drop having a voltage dropping slope of the first input terminal that exceeds a predetermined threshold in voltage level drop and/or a threshold of the voltage dropping slope.

16. The protection circuit according to claim 15, wherein the voltage measurement circuit comprises a voltage divider circuit comprising at least two impedances connected in series and a voltage level between the at least two impedances.

17. The protection circuit according to claim 15, wherein the first input terminal is part of a DC link and the second input terminal is part of a ground line, and wherein the protection circuit further comprises a shunt resistor in series with the ground line.

18. The protection circuit according to claim 17, wherein the digital controller is further arranged for monitoring an operating condition of the DC operated application device by means of the shunt resistor.

19. The protection circuit according to claim 18, further comprising an overload switch in series with the DC link; and wherein the digital controller is further arranged for:
   detecting an overload condition of the DC operated application device by means of the shunt resistor; and
   operating the overload switch to disconnect the DC link from the second stage; and/or
   operating the power switch and/or a ground switch to de-activate the local PSU or a local PSU controller.

20. The protection circuit according to claim 19, wherein the overload switch is a solid state component, such as MOSFET, JFET, bipolar transistor, or other type of switching element.

21. The protection circuit according to claim 15, further comprising an auxiliary power source for powering the digital controller, the auxiliary power source comprising a battery, an active power source fed by a DC link connected to the first input terminal, or another active power source.

22. The protection circuit according to claim 15, wherein the digital controller controls activating and de-activating of the local PSU for supplying power to electronics of the DC operated application device by:
   operating a power switch connecting an auxiliary power source to a power input of the local PSU; and/or
   operating a ground switch connecting a ground line to a soft-start input of the local PSU.

23. A DC operated application device comprising the protection circuit according to claim 15.

24. A method for disconnecting the DC operated application device from the DC power source, wherein the DC operated application device is provided with the protection circuit according to claim 16, the method comprising:
   monitoring the voltage level of the input terminals;
   when detecting the voltage drop across the input terminals, de-activating the local PSU of the DC operated application device and/or, if a DC link switch is present, opening the DC link switch.

* * * * *